Figure 1:
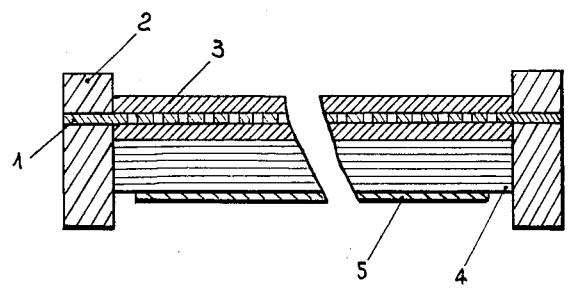

May 15, 1962 J. M. N. HANLET 3,035,177

ELECTROPHOTOLUMINESCENT DEVICES

Filed Nov. 29, 1957

Inventor:
Jacques M. N. Hanlet
Attorney:
Ralph B. Stewart

United States Patent Office 3,035,177
Patented May 15, 1962

3,035,177
ELECTROPHOTOLUMINESCENT DEVICES
Jacques Marie Noel Hanlet, Paris, France, assignor to Societe d'Electronique et d'Automatisme, Courbevoie, France
Filed Nov. 29, 1957, Ser. No. 699,576
Claims priority, application France Feb. 28, 1957
1 Claim. (Cl. 250—213)

The present invention concerns improvements in or relating to electrophotoluminescent devices, of the kind which comprises an operative association of at least one photoresistive member and one electroluminescent member such that any internal change of resistance of the photoresistive member thereof, in response to a change of an optical excitation thereof, produces a corresponding change of state of the said electroluminescent member. With such a device, when an optical image or picture is focussed onto the said photoresistive member, such an optical image is reproduced onto the said electroluminescent member and, most often, with a conversion of the optical wavelength from the light received on the photoresistive surface to the light emitted for display on the electroluminescent surface in the device.

In his prior application No. 631,223, now Patent No. 2,929,950, applicant has already proposed to constitute such a device of the above-specified kind by the superposition of two very thin layers, one of which is made of a photoresistive semi-conductor material and the other of which is made of a semi-dielectric electroluminescent material, such a composite assembly being joined between a pair of translucent conducting films forming electrodes thereof. When the impinging activating light is already modulated with respect to the intensity thereof in an "alternating" way, the application of a D.C. potential difference across the said electrodes suffices for preserving the device in the operative condition, and when this activating light is not so modulated, the said potential difference must be an alternating current voltage, not necessarily of sine waveform.

In this device however, the resolution of the display was only determined by that of the light image projected on the said photoconductive member. An object of the invention is to provide a device of the kind specified wherein a definite resolution factor is imposed, this being obtained without any recourse to any kind of scanning process, neither optical nor electronical, but the fineness of such a resolution being, when required, very high per se.

Another object of the invention is to provide such a device which presents a very high energetic efficiency, specially in that dispersion of charges within the photoresistive layer is avoided in their travels to the electroluminescent layer of the device.

According to the invention, an electrophotoluminescent device of the general character herein above specified is made of the combination of a thin layer of photoresistive material, a thinner conducting sieve or grid of fine meshes embedded within the said photoresistive layer, an electroluminescent layer applied on one side of the said photoresistive layer, and a translucent conducting film on the side of the said electroluminescent layer opposite to that associated to the said photoresistive layer in the device.

In operation, the above-defined potential difference is applied across the said conducting sieve or grid and the said conducting armature. As each one of the meshes of the said sieve receives a definite and uniform potential, each one of the said meshes defines a guiding duct or passageway for the electrons which will be freed in that part of the photoresistive material facing the light activating source and the thus mobile charges will displace in each one of the said ducts to finally reach the electroluminescent material of the layer applied on the opposite face of the photoresistive material. The said electroluminescent material will then be punctually activated, without any substantial or noticeable diffusion of enlighted spots. Those parts of the photoresistive material which are beneath the lines of the sieve or grid obviously are not useful for such an activation but they advantageously serve to insulate the electroluminescent material from the said sieve or grid embedded within the said photoresistive material.

In order that diffusion of electric charges within the ducts shall not occur, it is apparent that the meshes of the said conducting sieve of grid defining these ducts must be as small as possible in cross-section area thereof. They may be for instance of about 50 microns, for instance, of side length each. Further, in order that the energetic efficiency of the device shall be high it is required that the thickness of the said photoresistive layer through any one of such ducts be quite small and for instance, does not exceed a value of about ten microns. The grid or sieve must then imperatively be of a quite small thickness, of the order of two or three microns for instance. It is consequently apparent that no commercial metallic sieve fabric can be used for constituting that member of a device according to the present invention. A grid of such small thickness is not self-supporting, that is, it cannot maintain itself in a flat plane.

According to a subsidiary feature of the invention, such a grid or sieve is the article obtained from a photoetching operation made on a thin film of suitable thickness previously deposited on a temporary supporting plate, the photo-etched film being removed from the said temporary support and mounted in a conducting frame which then ensures the useful mechanical strength of the meshed film and may advantageously be further used for supporting the complete structure of the electrophotoluminescent device.

Illustratively, the method of making such a sieve or grid as useful in the invention may be stated as follows:

A thin and uniform film of collodion is deposited over a neatly prepared, e.g. thoroughly cleaned, surface of a glass plate which will serve as a temporary support. The collodion to be used is for instance constituted by a mixture of 2% of nitrocellulose, 1% of ethylic alcohol at 95° Bé., 2% of a plastifier such as neutral ethyl phthalate, and 95% of a solvent such as butyl acetate, these proportions being expressed per weight in the said mixture, to which, at the very instant of deposition on the said glass surface, is actively mixed an equal volume of butyl acetate.

On the thus formed collodion layer, a film of pure copper is deposited by evaporation under vacuum, until the required thickness is reached. For such an evaporation step, the glass collodion-coated plate is introduced within a vessel in front of a number of crucibles arranged into an isotropic pattern with respect to the surface of the plate and each one containing a quantity of copper. As examples of isotropic arrangements, one may cite the one consisting of four crucibles in front of the four corners of the collodion-coated plate, if the latter is square, or the one consisting of a number of crucibles forming a ring when the said plate is circular, and so forth. The vessel is then evacuated and the said crucibles are heated up to the evaporation point of copper. The evaporated copper will obviously deposit onto the facing collodion layer, and the purity of the copper film is automatically obtained from the thermic selective evaporation occurring in such an arrangement, as is will known in the art.

Once the required thickness of the film is reached, the film supporting plate is cooled down and brought out of the vessel. It is then coated, over the said pure copper film, in any conventional manner, well known in the art, with a photosensitive layer, for instance a layer based upon the use of fish glue sensitized with potassium bichromate. The pattern of the sieve to be obtained is optically impressed as in usual photography, the resulting impression will appear after development, washing and drying of the article. The development may be made in pure water as is well known.

Etching (engraving) is made by immersing the article within an acid bath, for instance a bath of iron perchloride of 65° Bé. There remains a copper sieve glued to the support, the meshes of which have been completely perforated by the acid bath. The article is washed and dried as usual, and thereafter merged into acetone which dissolves the collodion and enables the removing from the glass support of the sieve or grid of thickness and mesh-dimension required for the use in a device according to the invention. This sieve is then mounted in a mechanical supporting frame, preferably of conducting material as herein above stated. This frame may advantageously be made of nickel. Thereafter, and in order to improve the uniformity of the density of the copper in the sieve and in order further to better stretch the said sieve or grid, the mechanical member formed by the said grid and its supporting nickel frame is heated at about 900° C. within a reducing atmosphere.

Such a grid will then be embedded within a photoresistive semi-conductor material. Any known process for such an embedding may be used, as are for instance the deposition of material from a pyrolitic conversion of vapours of halides of the chemical components wanted for the said photoresistive material, or the painting or impregnating of the sieve with a colloidal solution of such materials followed by a heating preferably made from a high frequency heater for recrystallizing of the said components on the sieve, and so forth. Obviously the choice of the semi-conductor will be made in accordance to the wavelength of the radiation to receive on the final product, and sufficient numbers of such materials are presently known for such uses as to enable the omission of any citation thereof.

The electroluminescent layer will apparently be constituted from compositions utilizing sulfides and oxides of activating and activated materials, as usual. It suffices here to state that such an electroluminescent layer will for instance and preferably be made with a thickness within a range from about 50 to about 100 microns. Such an electroluminescent layer may for instance and not imperatively be obtained from a process of ionic discharge transfer in a suitable atmosphere of the chemical components of the said activator and activated sulfides and/or oxides, viz. the metallic elements thereof, the said atmosphere being either $SH_2$ or $O_2$. Such an ionic discharge transfer method has been fully disclosed in my co-pending application No. 631,224 now Patent No. 2,917,442 and in the present case, it may be stated that the potential difference producing the concerned ionic discharge is applied across the plate of alloy of the said basic chemical components and the sieve or grid which face each other at a short distance thereof, in parallel planes, within a reduced pressure atmosphere of a gas suitable for the sulfuration or oxidation of the transferred particles from the said alloy plate to the said sieve or grid. As said in the said copending application, a high frequency heating is ensured for the receiving member, viz. the sieve, for the recrystallization thereon of the electroluminescent composition.

The formation of the film electrode over the surface of the said electroluminescent layer might be obtained from a pyrolitic conversion process of a composition of oxides and/or nitrides, such as disclosed in my co-pending application No. 636,410 now Patent No. 3,019,137, but of course, such a step may only be used when the electroluminescent material is able to withstand the high temperature required for such a conversion step. It is preferably provided, according to a subsidiary feature of the present invention, to proceed as follows, for the formation of such an electrode: firstly a film of titanium is evaporated under a medium vacuum onto the free surface of the electroluminescent layer, a mask being provided to prevent the deposition of titanium on an outer portion of the said area so that no short-circuit to the frame of the structure may occur; as titanium is evaporated in a rarefied but existing air atmosphere, the said film will be a film of titanium dioxide $TiO_2$, which, as is well known per se, is of a great translucence. However such a film presents the known drawback of having a quite high electrical resistance, of the order of one megohm per square area of the film. It is remembered that, for such films, the resistance varies only with respect to the thickness of the film and does not depend upon the value of the area covered by the film, when related to a square area for a definition of the resistance thereof. A second operative step will consequently be one which will lower the resistance of such a titanium dioxide film down to an order of 1,000 ohms per square and this may be obtained by powdering the area of the film with powdered silver or aluminium and moderately heating to about 200 to 300° C. within a hydrogen atmosphere. This step does not react on the quality of the electroluminescent materials which may be used, whatsoever, in the device, and does not alter the transparence of the film but results in the required lowering of the electrical resistance thereof.

Figure 2:
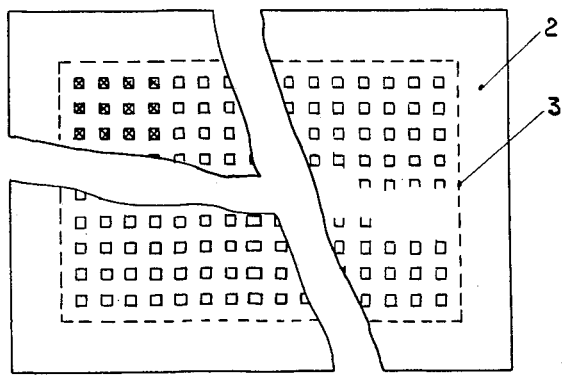

An illustrative embodiment of a device according to the invention is shown on the accompanying drawing, wherein FIG. 1 is a cross-section and FIG. 2 a top view thereof.

In these figures no relative dimensioning is respected, for the sake of clarity. The sieve or grid is shown at 1, embedded within a photoresistive material 3 and mounted in a frame 2. The electroluminescent material is shown at 4 and the translucent electrode is shown at 5. No further description appears useful for this example, the operation of which clearly agrees with that which has been herein above stated.

I claim:

A method of manufacturing an electrophotoluminescent device which comprises the steps of depositing a removable insulating layer over a dielectric base plate, depositing thereon a film metallic deposit, photo-etching the said film in accordance with the pattern of a sieve, removing the said insulating layer and mounting the said metallic sieve into a self-supporting frame of metal, annealing the said sieve mounted in the said frame, depositing a layer of photoresistive material on both faces of said sieve to embed said sieve in photoresistive material, depositing on a face of said deposited photorestrictive material a layer of electroluminescent material, and depositing a film of translucent conducting material over the free surface of the said electroluminescent material layer.

References Cited in the file of this patent

UNITED STATES PATENTS

| | | |
|---|---|---|
| 1,724,298 | Miller | Aug. 13, 1929 |
| 2,540,490 | Rittner | Feb. 6, 1951 |
| 2,594,740 | De Forest et al. | Apr. 29, 1952 |
| 2,794,081 | Luhn | May 28, 1957 |

FOREIGN PATENTS

| | | |
|---|---|---|
| 157,101 | Australia | June 16, 1954 |